United States Patent
Modafferi

(10) Patent No.: US 6,578,351 B1
(45) Date of Patent: Jun. 17, 2003

(54) APU CORE COMPRESSOR PROVIDING COOLER AIR SUPPLY

(75) Inventor: Mario Modafferi, Laval (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 09/942,546

(22) Filed: Aug. 29, 2001

(51) Int. Cl.$^7$ .................................. F02G 3/00
(52) U.S. Cl. ................ 60/39.08; 60/782; 415/144
(58) Field of Search .................. 60/39.08, 39.83, 60/782, 785; 415/144, 145, 119

(56) References Cited

U.S. PATENT DOCUMENTS

| | | | |
|---|---|---|---|
| 2,696,074 A | 12/1954 | Dolza | 60/12 |
| 3,719,426 A | 3/1973 | Friberg et al. | 415/116 |
| 3,730,639 A | 5/1973 | Moore et al. | 415/119 |
| 3,979,903 A | 9/1976 | Hull, Jr. et al. | 60/39.09 |
| 4,052,845 A | 10/1977 | Tumavicus | 60/226 |
| 4,141,672 A | 2/1979 | Wieland et al. | 415/202 |
| 4,372,113 A | 2/1983 | Ramer | 60/325 |
| 5,105,616 A * | 4/1992 | Bornemisza | 60/39.36 |
| 5,235,801 A * | 8/1993 | Evenson et al. | 69/39.02 |
| 5,357,742 A | 10/1994 | Miller | 60/39.07 |
| 5,673,559 A | 10/1997 | Benson | 60/602 |
| 5,740,674 A * | 4/1998 | Beutin et al. | 60/226.1 |
| 5,791,138 A * | 8/1998 | Lillibridge et al. | 60/262 |

FOREIGN PATENT DOCUMENTS

| | | |
|---|---|---|
| DE | 722424 | 7/1942 |
| DE | 2344023 | 3/1975 |
| DE | 3512714 | 9/1986 |
| FR | 1006128 | 4/1952 |
| FR | 1059635 | 11/1953 |

* cited by examiner

Primary Examiner—Charles G. Freay
Assistant Examiner—John F. Belena
(74) Attorney, Agent, or Firm—Todd Bailey

(57) ABSTRACT

Air captured from the tips of a compressor of a gas turbine engine is diverted from the engine core and can be collected for auxiliary uses. Gas path separation can be achieved using part-span shrouded compressor blades or using blade tip cut-outs conforming to an airflow dividing annular shroud. In a preferred application for the present invention, the gas turbine engine is the auxiliary power unit of an aircraft. This permits compressed air generation for Auxiliary Power Unit oil cooling and for compartment pressurization without loosing significant mass flow to the engine core, while eliminating the need to provide a separate active cooling system such as an engine driven fan.

20 Claims, 4 Drawing Sheets

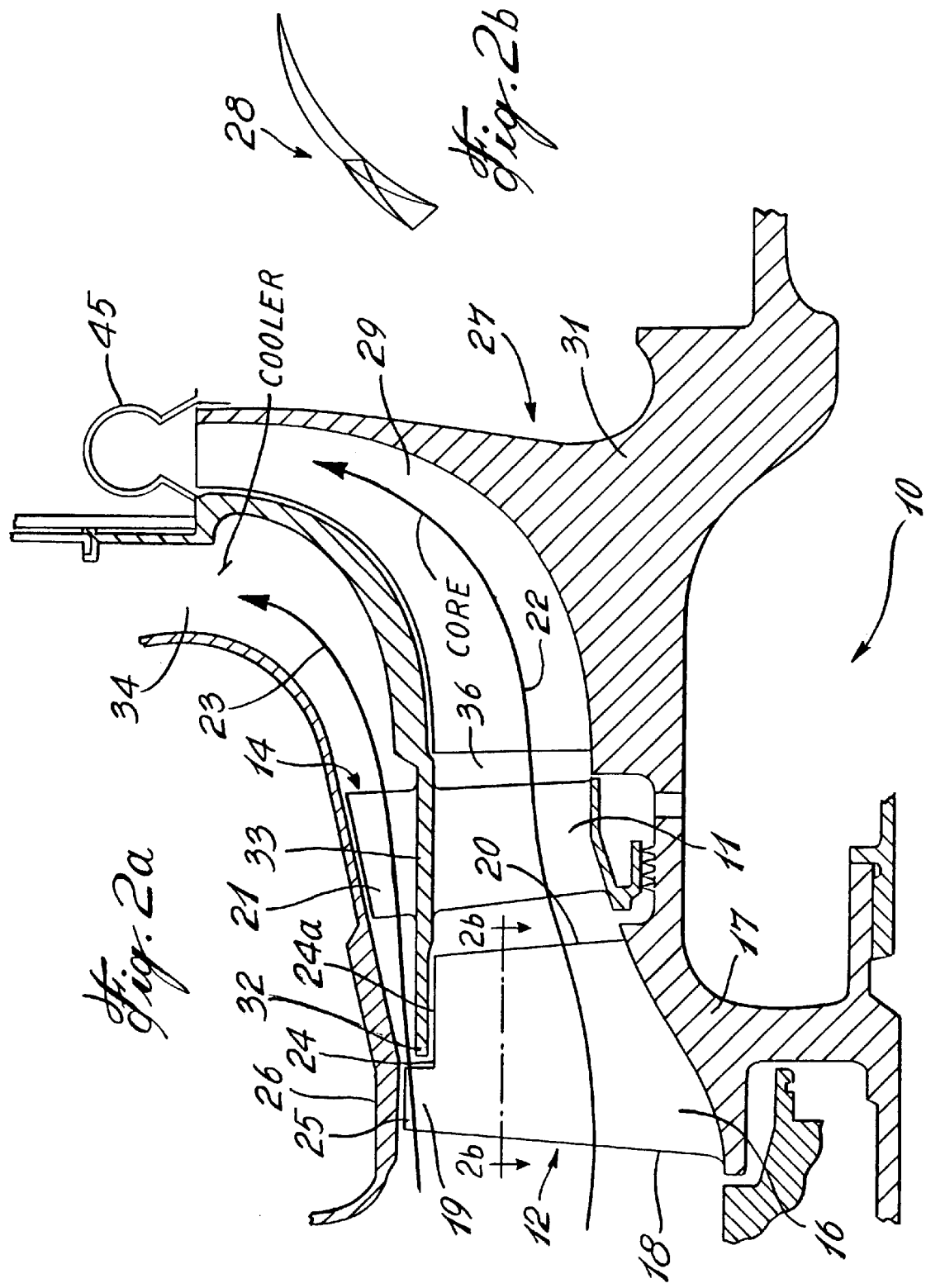

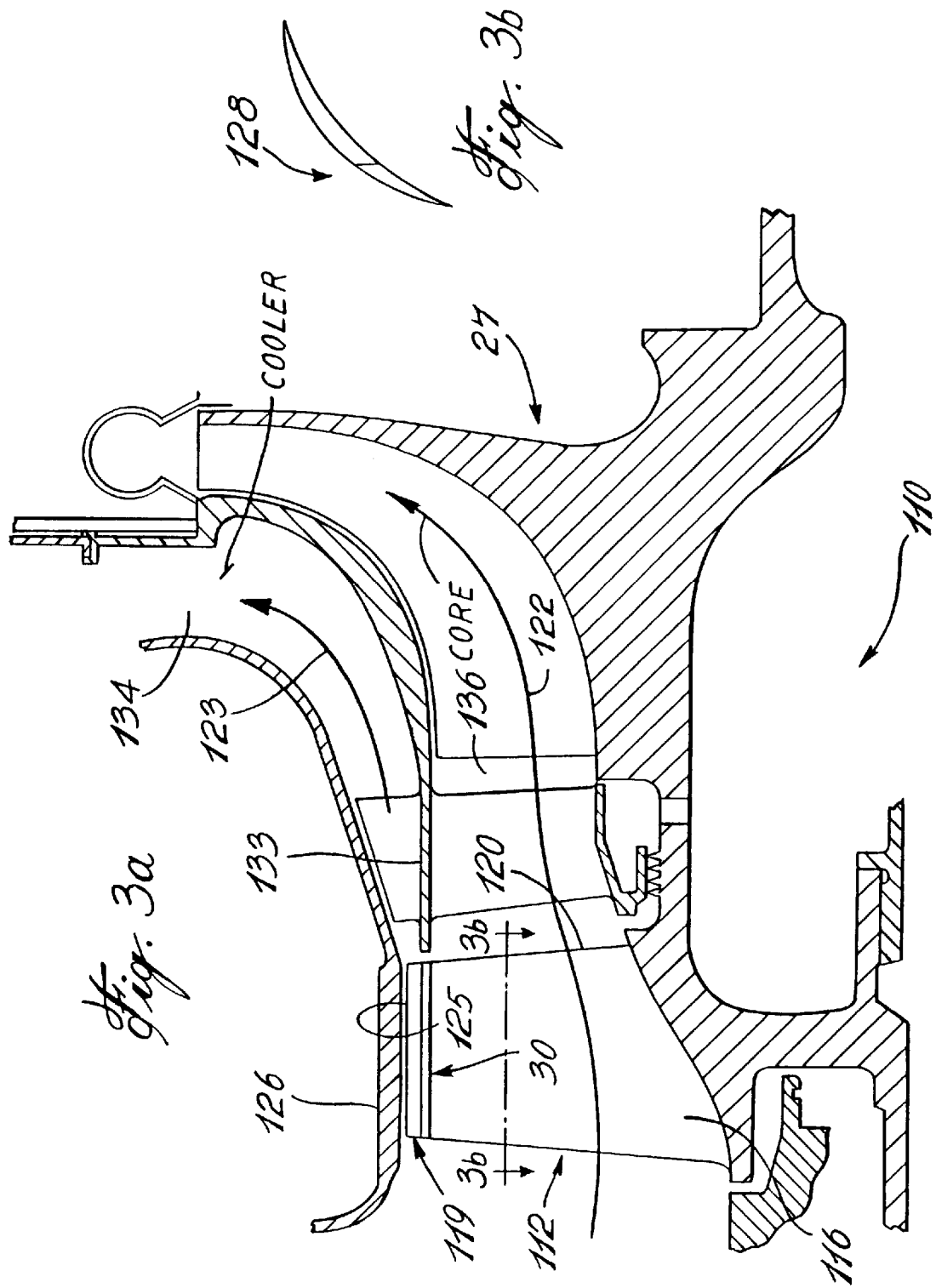

APU CORE COMPRESSOR PROVIDING COOLER AIR SUPPLY

TECHNICAL FIELD

The present invention relates to gas turbine engine compressors, and more particularly to capturing air from a compressor tip for auxiliary uses. More specifically, it pertains to using the captured air supply for the passive cooling of an auxiliary power unit.

BACKGROUND OF THE INVENTION

Gas turbine engine powerplants are used in the vast majority of aircraft flying today. Most large commercial aircraft include an auxiliary power unit (APU), generally a small gas turbine engine, often mounted in the aft tail section of the aircraft, which provides electrical power and pressurized air for aircraft environmental control systems when the aircraft is on the ground, and is also used to start the main engines of the aircraft. APUs require external cooling and are lubricated by oil that is generally cooled by an air cooled oil heat exchanger.

Active cooling systems are most often employed to provide this cooling air, and are typically comprised of a fan used to push air through the oil cooler and across auxiliary power unit components. These fans are driven at high speeds by the APU through relatively complex shaft and gear assemblies. The mechanical complexity and high operating speeds of these fans increase the possibility of failure of the cooling system, which would eventually lead to APU shutdown. Active fan cooling systems therefore significantly reduce the reliability of an auxiliary power unit, and add considerable cost and weight. While various passive cooling systems exist, they often require ducting air from the exterior of the aircraft, and fail to be able to provide compressed air for other uses.

Various systems used to separate compressor airflow are known. U.S. Pat. No. 5,357,742 issued Oct. 25, 1994 to Miller, for example, discloses metering cooling air exhausted through a turbojet laminar flow nacelle system, to cool the core engine compartment. Air bled from the entry to the core engine compressor drives a turbocompressor pump which draws cooling air through the laminar flow nacelle system and into a manifold surrounding the engine. This system has the disadvantage of requiring a separate pump to provide the compressed cooling air.

Separating airflow from the exit of a centrifugal compressor is also known. In U.S. Pat. No. 2,696,074 issued Jan. 2, 1953 to Dolza, an engine and torque converter cooling system having a two stage impeller and an annular diffuser is disclosed. Air is diverted from the main air stream flow, into either impeller stage. One or both of the impeller stages can be engaged. Two separate diffuser inlet nozzles accept air from each impeller stage and feed two diffuser chambers, one intended to cool the torque converter and the other the engine. The inlet airflow to the impeller is separated from its inlet and is selectively directed to one or both impeller stage inlets.

Passive cooling solutions particularly for auxiliary power units are numerous. U.S. Pat. No. 6,092,360 issued Jul. 25, 2000 to Hoag et al., discloses an APU passive cooling system in which cooling air is drawn into the engine compartment through an opening located in the rear of the aircraft. An eductor mounted before the exhaust duct of the engine, draws compartment air through the oil cooler, which in turn draws atmospheric air in through the aft opening.

Therefore, while methods of auxiliary power unit oil cooling and compartment pressurization exist which eliminate active cooling systems, there is a need for an APU built-in passive cooling system capable of providing compressed air for cooling and other uses. While some attempts have been made to use compressors as a source of cooling air, none employ the engine core compressor for a cooling system that does not require additional ducting of cooling air from the exterior of the aircraft.

SUMMARY OF THE INVENTION

It is an object of the present invention to supply cool air from the compressor of a gas turbine engine to be used for a means other than power generation.

It is another object of the present invention to fulfil the cooling and compartment pressurization requirements of an auxiliary power unit in an aircraft.

Therefore, in accordance with the present invention, there is provided a gas turbine engine compressor, comprising: a rotor adapted to rotate about a central axis, the rotor having a hub and rotor blades extending radially from the hub; an annular compressor casing being concentric with said central axis and defining an outer wall; said rotor blades having tips wherein at least part of said tips are in close proximity with said outer wall, and said blades having end portions near said tips; said outer wall extending upstream of said rotor, permitting substantially unobstructed fluid flow communication between an exterior air source and said rotor; an annular shroud within said compressor casing and concentric with said central axis, extending downstream from said rotor; a first annular duct defined within said annular shroud; said annular shroud and said outer wall defining a second annular duct; said first duct permitting core fluid flow communication between said rotor and a compressor outlet; and said second duct adapted to supply air from at least said end portions of said blades for auxiliary use.

BRIEF DESCRIPTION OF THE DRAWINGS

Further features and advantages of the present invention will become apparent from the following detailed description, taken in combination with the appended drawings, in which:

FIG. 2a is an axial cross sectional view of the axial compressor of a first embodiment of the present invention.

FIG. 2b is a cross sectional view of a rotor blade along line 2b—2b in FIG. 2a.

FIG. 3a is an axial cross sectional view of the axial compressor of a second embodiment of the present invention, having a part-span shrouded rotor.

FIG. 3b is a cross sectional view of the rotor blade taken along line 3b—3b in FIG. 3a.

FIG. 4b is a cross sectional view of the blade taken along line 4b—4b in FIG. 4a.

DETAILED DESCRIPTION OF THE PREFERRED EMBODIMENT

Figure 1:
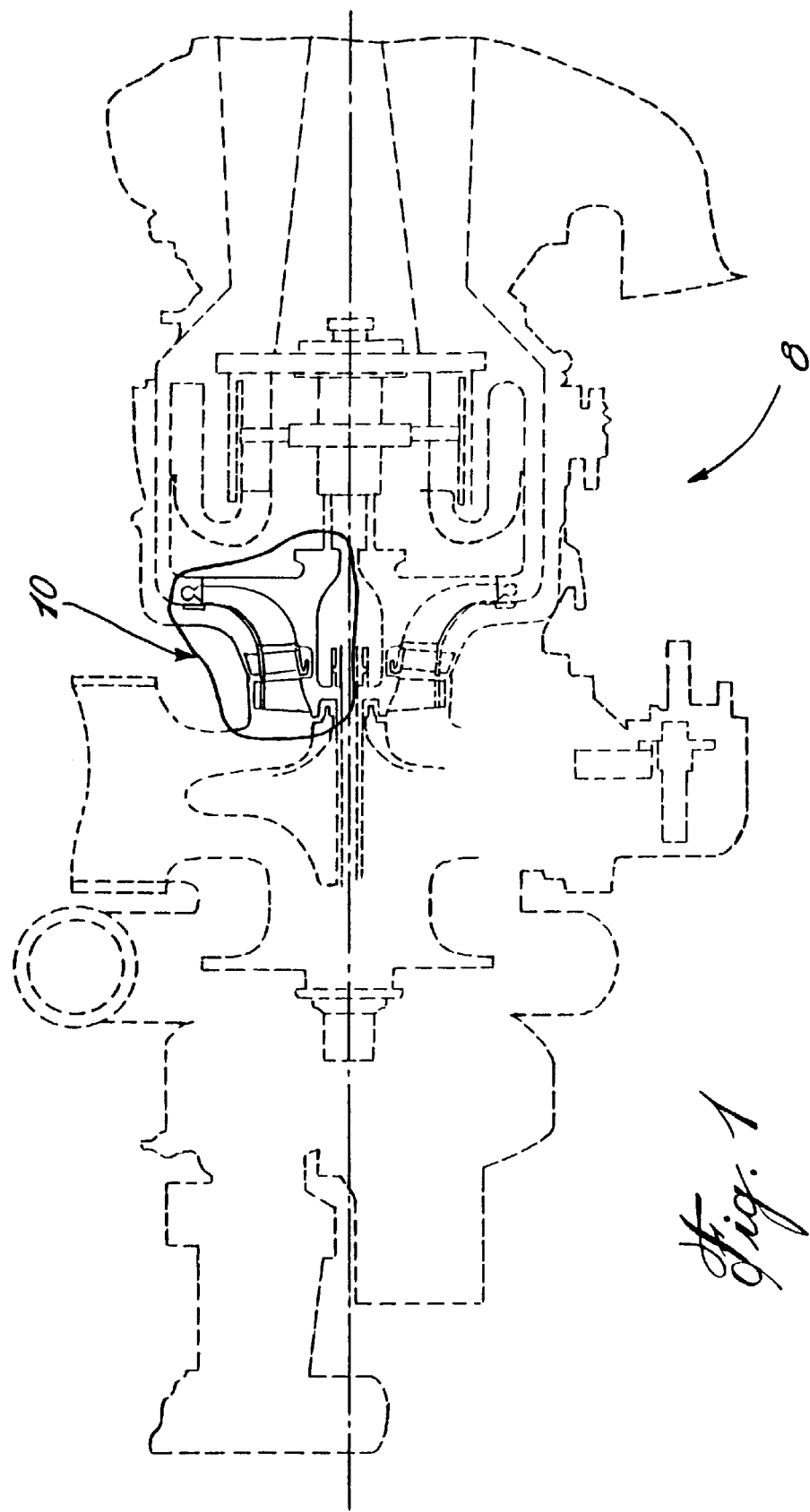
FIG. 1 is a schematic axial cross section of a gas turbine engine having a compressor according to the present invention.

FIG. 1 shows an auxiliary power unit gas turbine engine 8 comprising a compressor portion 10 of the present invention. Referring to FIG. 2a, the compressor portion 10 has principle components generally comprising a rotor 12, a stator 14 and a radial outflow impeller 27. For illustration purposes, FIG. 2a and FIG. 3a show a compressor having a single axial stage and a single centrifugal stage. However, the concept of the present invention is applicable to many forms of compressors, those having single stages for example or combinations of any number of axial and centrifugal stages.

The rotor assembly 12 rotates axially about the engine center axis and generally serves to increase the velocity of the incoming air. The rotor 12 is principally comprised of a central rotor hub 17 and a plurality of radially extending rotor blades 16 having tips 25. The stator 14 is comprised of a plurality of axially extending stator vanes 11 which redirect the air flow exiting the rotor blades 16 and increases the static pressure of the air. The gas path 22 is shown for the main compressed air duct to the engine core.

The rotor 12 can be a one piece unit, an "Integrated Bladed Rotor", comprising the central rotor hub 17 and the integral rotor blades 16. Traditionally, however, individual blades 16 are mounted on the central hub 17 using a fir-tree style attachment well know in the art, and can have either shrouded or non-shrouded tips. Throughout the compressor, the gas flow path decreases in cross-sectional area in the direction of flow. This reduces the volume of the air as compression progresses. The centrifugal compressor stage comprises the impeller 27, a single forging often composed of titanium that generally has a plurality of blades 29 and an integral hub 31, and a diffuser 45. The blades 29 guide the axial air toward the outer circumference of the impeller, increasing the velocity of the air by means of the high rotational speed of the impeller. The subsequent diffuser 45 serves to straighten the airflow and to convert the high velocity, high kinetic energy into low velocity, high pressure energy. The use of axial and centrifugal compressors is well know in the art.

In the present invention, a flow dividing annular shroud creates a bifurcation in the compressor exit gas path, providing an alternate externally directed gas path for pressurized cooling air which can be used for purposes other than power generation, such as APU oil cooling and compartment pressurization requirements.

In the first embodiment shown in FIG. 2a, the rotor blades 16 do not have a constant radial length, resulting in upstream tips 25 and a cut out up stream portion 24 at the trailing edge of each blade 16. A flow dividing annular shroud 33, is radially located between the outer wall 26 of the annular compressor casing and the inner hubs of the compressor elements, to be axially extended upstream from the trailing edges 20 of the rotor blades 16 towards the leading edges 18. The upstream tips 25 of the rotor blades pass in close proximity to the outer wall 26 of compressor casing. The downstream tips 24a, trace a smaller radius of rotation, and pass in close proximity to the flow dividing annular shroud 33. This allows air flow, shown with gas path 23, coming off the blade end portions 19 to be channelled by the bifurcation 32, through a second annular duct 34 defined by the annular shroud 33 and the compressor casing outer wall 26. Flow, following gas path 23, then axially flows past the end portions 21 of the stator vanes 11, and can then be ducted out of the engine compressor for auxiliary uses. The first annular duct 36 for core air provides fluid flow communication between the rotor blades 16 and the centrifugal compressor diffuser 45 at the compressor exit. The first annular core air duct 36 is concentric with the second annular auxiliary air duct 34, and provides for an engine core gas path 22 substantially unchanged from ordinary gas turbine compressors without the present invention.

For a compressor portion 110 of an alternate embodiment shown in FIG. 3a, rotor blades 116 of the rotor 112 comprise part-span shrouds 30 which divide air flow between the engine core duct 136 and the auxiliary air supply duct 134. The part-span shrouds 30 are radially located near the remote end portions 19 of the blades 116 and aligned with the flow dividing annular shroud 133, which begins just downstream of the trailing edges 120 of the blades 116. This eliminates the need for the cut out in the rotor blade end portions tips 119, as shown in the embodiment in FIG. 1a, The tips 125 of the rotor blades 116 nevertheless pass in close proximity to the outer wall 126 of compressor casing. The traditional advantage of rotors having shrouded blades, which form a band around the perimeter of the compressor rotor blade tips in their most common usage, is the reduction of blade vibrations. The added weight of the shrouds is offset by a thinner blade profile, permitted by the radial support of the shroud, which would otherwise be impossible because of vibration limitations. FIG. 3b shows the thinner profile 128 of the shrouded blade 116, while FIG. 2b shows, in comparison, the thicker profile 28 of the non-shrouded blades 16. Shrouds also serve to improve the air flow characteristics, increase the efficiency of the compressor rotor and serve to cut down the air flow leakage around the tips of the blades. The rotor blades 116 having part-span shrouds 30 in this embodiment of the present invention, retain these traditional advantages of a shrouded compressor rotor for the compressed engine core air, which follows gas path 122 through the annular core air duct 136, while permitting air flow for auxiliary cooling uses to separately follow the gas path 123 through the annular auxiliary air source duct 134. The added advantage of the separation of flows using a part span shrouded bladed axial rotor as shown in FIG. 2a, is that the amount of compression can be independently designed for the air supplied to the engine core and the air supplied for auxiliary cooling.

Figure 4A:
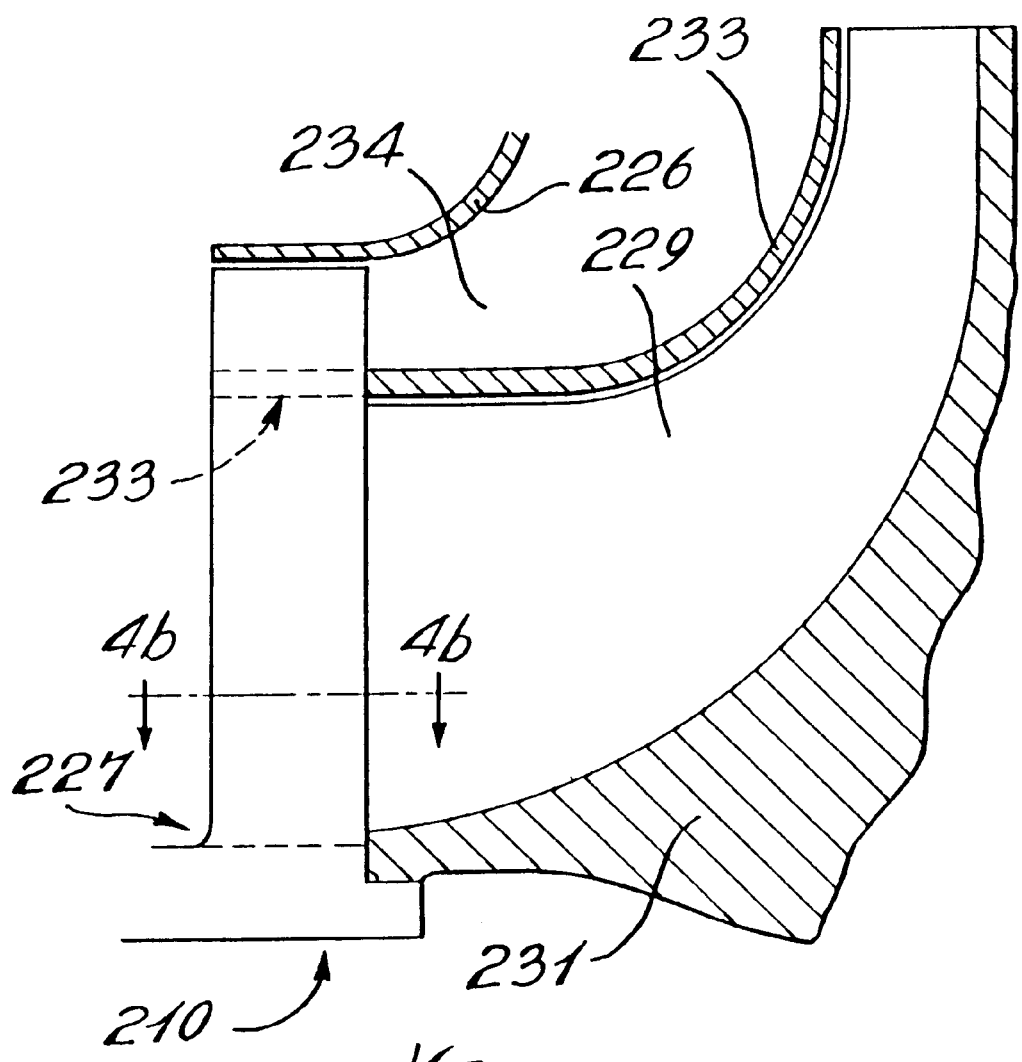
FIG. 4a is an enlarged axial cross sectional view of a compressor of a further embodiment of the present invention, showing an annular flow dividing shroud fixed to the blades of a one stage centrifugal compressor.
Figure 4B:

FIG. 4a shows an further embodiment of the present invention having only a single centrifugal compressor 210. The flow dividing annular shroud 233 extends upstream into the blades 229 of the impeller 227. In this case, the shroud 233, fixed to the blades 229, acts as a single unit part-span shroud, and the entire shroud 233 rotates with the impeller 227. The rotating shroud 233 separates the two gas paths and acts as the annular shroud dividing concentric annular ducts as per the previous embodiments. Alternately, the duct dividing shroud 233 can also be fixed, to a compressor manifold for example, rather than being part of the rotating compressor element, and begin immediately downstream of the inlet impeller blades trailing edges. A part-span shroud on the impeller and a fixed annular shroud downstream, similar to the embodiment of FIG. 3a for the axial compressor, is another possible alternative. As per the other embodiments, the annular auxiliary air supply duct 234 is defined by the a annular shroud 233 and the outer wall 226 of the compressor casing. FIG. 4b shows the profile of a possible blade airfoil.

In one application of the present invention, it is proposed to use air diverted from the tips of the axial or centrifugal stage compressor of an auxiliary power unit, for air cooled oil cooling and compartment pressurization requirements. The present invention would therefore provide a passive cooling system which eliminates the need to provide a separate fan running as an accessory to the engine, and is self-contained within the engine. This translates into a significant cost and weight saving as well as improved product reliability. The auxiliary air produced by the compressor could equally be collected and used for multiple other uses.

The embodiments of the invention described above are intended to be exemplary only. The scope of the invention is therefore intended to be limited solely by the scope of the appended claims.

What is claimed is:

1. A gas turbine engine compressor, comprising:
   a rotor adapted to rotate about a central axis, the rotor having a hub and rotor blades extending radially from the hub;
   an annular compressor casing being concentric with said central axis and defining an outer wall;
   said rotor blades having tips wherein at least part of said tips extend to said outer wall, and said blades having end portions near said tips;
   said outer wall extending upstream of said rotor, permitting substantially unobstructed and undivided fluid flow communication between an exterior air source and said rotor;
   a stationary annular shroud within said compressor casing and concentric with said central axis, extending downstream from said rotor, said annular shroud having a leading edge which is substantially parallel to said central axis;
   a first annular duct defined within said annular shroud;
   said annular shroud and said outer wall defining a second annular duct;
   said first duct permitting core fluid flow communication between said rotor and a compressor outlet; and
   said second duct adapted to supply air from at least said end portions of said blades for auxiliary use.

2. The gas turbine engine compressor as defined in claim 1, wherein said rotor blades each have a leading edge and a trailing edge and each rotor blade has a cut-out portion in the end portion and the annular shroud extends upstream within said cut-out portions of the rotor blade.

3. The gas turbine engine compressor as defined in claim 2, wherein said rotor blades each have a remaining end portion extending to the tip upstream of the shroud.

4. The gas turbine engine compressor as defined in claim 3, wherein an axial edge of said end portion defining the cut out passes in close proximity to said annular shroud.

5. The gas turbine engine compressor as defined in claim 1, wherein said rotor blades have at least a flange extending from both sides of each blade to form part-span shrouds concentric with the central axis and aligned with said annular shroud.

6. The gas turbine engine compressor as defined in claim 5, wherein said part-span shrouds extend downstream from said rotor blades and replace a portion of said annular shroud.

7. The gas turbine engine compressor as defined in claim 1, wherein the cross sectional area of said first duct decreases in the direction of flow.

8. The gas turbine engine compressor as defined in claim 1, wherein said compressor comprises a plurality of rotors and stators.

9. The gas turbine engine compressor as defined in claim 1 wherein said gas turbine engine is an auxiliary power unit, and wherein an auxiliary use includes at least providing cooling air for a passive oil cooling system for said auxiliary power unit.

10. A gas turbine engine compressor comprising:
    a rotor adapted to rotate about a central axis, the rotor having a hub and rotor blades extending radially from the hub;
    an annular compressor casing being concentric with said central axis and defining an outer wall;
    said rotor blades having tips wherein at least part of said tips extend to said outer wall, and said blades having end portions near said tips;
    said outer wall extending upstream of said rotor, permitting substantially unobstructed and undivided fluid flow communication between an exterior air source and said rotor;
    a stationary annular shroud within said compressor casing and concentric with said central axis, extending downstream from said rotor;
    a first annular duct defined within said annular shroud, said first duct permitting core fluid flow communication between said rotor and a compressor outlet; and
    said annular shroud and said outer wall defining a second annular duct, said second duct adapted to supply air from at least said end portions of said blades for auxiliary use,
    wherein said gas turbine engine is an auxiliary power unit, and wherein an auxiliary use comprises providing cooling air for a passive oil cooling system for said auxiliary power unit.

11. The gas turbine engine compressor as defined in claim 10 wherein the compressor includes a second compressor stage downstream of said rotor.

12. The gas turbine engine compressor as defined in claims 10 wherein said rotor blades have at least a flange extending from both sides of each blade to form part-span shrouds concentric with the central axis and aligned with said annular shroud.

13. The gas turbine engine compressor as defined in claim 12 wherein said part-span shrouds extend downstream from said rotor blades and replace a portion of said annular shroud.

14. A gas turbine engine compressor comprising:
    a rotor adapted to rotate about a central axis, the rotor having a hub and rotor blades extending radially from the hub;
    an annular compressor casing being concentric with said central axis and defining an outer wall;
    said rotor blades having tips wherein at least part of said tips are in close proximity with said outer wall, and said blades having end portions near said tips;
    said outer wall extending upstream of said rotor, permitting substantially unobstructed fluid flow communication between an exterior air source and said rotor;
    an annular shroud within said compressor casing and concentric with said central axis, extending downstream from said rotor;
    a first annular duct defined within said annular shroud, said first duct permitting core fluid flow communication between said rotor and a compressor outlet;
    said annular shroud and said outer wall defining a second annular duct, said second duct adapted to supply air from at least said end portions of said blades for auxiliary use;
    a centrifugal impeller downstream of said rotor; and
    a stator interposed between said rotor and said centrifugal impeller.

15. The gas turbine engine compressor as defined in claim 14, wherein an auxiliary use comprises providing air for compartment pressurization in an aircraft.

16. The gas turbine engine compressor as defined in claim 14, wherein said impeller comprises blades each having at least a flange extending from both sides of each blade to form part-span shrouds concentric with the central axis and aligned with said annular shroud separating said first and second annular ducts.

17. The gas turbine engine compressor as defined in claim 14, wherein said impeller is fed by air from said first annular duct.

18. The gas turbine engine compressor as defined in claim 14 wherein said gas turbine engine is an auxiliary power unit, and wherein an auxiliary use includes at least providing cooling air for a passive oil cooling system for said auxiliary power unit.

19. The gas turbine engine compressor as defined in claim 14, wherein said rotor blades have at least a flange extending from both sides of each blade to form part-span shrouds concentric with the central axis and aligned with said annular shroud.

20. The gas turbine engine compressor as defined in claim 19, wherein said part-span shrouds extend downstream from said rotor blades and replace a portion of said annular shroud.

* * * * *